US007724408B2

(12) United States Patent
Menz et al.

(10) Patent No.: US 7,724,408 B2
(45) Date of Patent: May 25, 2010

(54) SECURITY SYSTEM, ESPECIALLY FOR SECURITY DOCUMENTS

(75) Inventors: Irina Menz, Diedorf (DE); Gunther Dausmann, Erding (DE); Benedikt Ahlers, Berlin (DE); Arnim Franz-Burgholz, Falkensee (DE)

(73) Assignee: Giesecke & Devrient GmbH, Munich (DE)

( * ) Notice: Subject to any disclaimer, the term of this patent is extended or adjusted under 35 U.S.C. 154(b) by 138 days.

(21) Appl. No.: 11/983,540

(22) Filed: Nov. 9, 2007

(65) Prior Publication Data

US 2008/0062485 A1 Mar. 13, 2008

Related U.S. Application Data

(63) Continuation of application No. 10/362,254, filed on Feb. 21, 2003, now Pat. No. 7,315,407.

(51) Int. Cl.

*G03H 1/00* (2006.01)
*G03H 1/22* (2006.01)
*G02B 5/32* (2006.01)

(52) U.S. Cl. .............................. 359/2; 359/32; 359/15; 283/86

(58) Field of Classification Search ..................... 359/2, 359/15, 32; 283/86

See application file for complete search history.

(56) References Cited

U.S. PATENT DOCUMENTS

| | | | | |
|---|---|---|---|---|
| 5,694,229 | A | 12/1997 | Drinkwater et al. | |
| 5,712,731 | A * | 1/1998 | Drinkwater et al. | 359/619 |
| 5,999,280 | A * | 12/1999 | Huang | 359/2 |
| 6,061,122 | A | 5/2000 | Hoshino et al. | |
| 6,062,604 | A * | 5/2000 | Taylor et al. | 283/72 |

FOREIGN PATENT DOCUMENTS

| | | |
|---|---|---|
| DE | 19729918 | 1/1999 |
| GB | 2196443 | 4/1998 |
| WO | WO98/15418 | 4/1998 |

* cited by examiner

*Primary Examiner*—Audrey Y Chang
(74) *Attorney, Agent, or Firm*—Dilworth & Barrese, LLP.

(57) ABSTRACT

The invention relates to a security system especially for security documents, wherein a security element is provided in a carrier plane, that under incident light holographically reconstructs a pattern outside the carrier plane, in which concealed information is stored and having a flat transparent verification element which on flat contact with the security element makes the information stored therein visible. The invention further relates to a security element and a verification element for use in the security system and a security document fitted with the security system. The invention additionally relates to an apparatus and a method for reading out the concealed information which is stored holographically in the pattern reconstructed on the security element under incident light.

6 Claims, 4 Drawing Sheets

SECURITY SYSTEM, ESPECIALLY FOR SECURITY DOCUMENTS

IN THE CROSS REFERENCE TO RELATED APPLICATIONS

Figure 1:
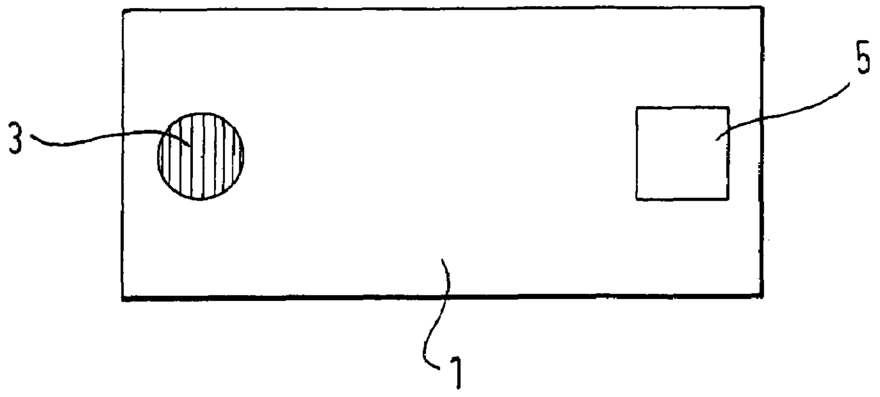

The present application is a continuation of application Ser. No. 10/362,254 filed on Feb. 21, 2003 now U.S. Pat. No. 7,315,407 to which priority is claimed and which is herein incorporated by reference.

The invention relates to a security system, especially for verifying the authenticity of security documents, consisting of a security element and a verification element which make concealed information visible by flat contact one with the other, and corresponding security elements, verification elements and security documents. The invention further relates to methods and apparatus for reading out concealed information.

Documents, certificates, banknotes, identity cards, plastic cards etc. can be reproduced faithfully in detail and colourfast with the aid of modern high-resolution colour scanners and using colour laser printers or thermal sublimation printers. As a result of the general availability of colour copiers, it has also become substantially easier to produce high-quality forgeries.

There is thus a need to make documents, identity cards, banknotes, security papers, plastic cards etc. secure against forgery by means of additionally applied security features. By means of such security features it can at least be accomplished that the production of a high-quality forgery is substantially more expensive. Water marks, silk threads, intricate line structures and the use of special papers are known as such security features. The application of metallised embossed holograms on bank notes, credit cards and Eurocheque cards has also become generally used in the meantime.

WO 98/15418 discloses a self-verifying security document which carries information at one location which is not generally recognisable under normal examination. At another location on the document there is applied a verification element which by folding the security document can be brought into register with the security element bearing the concealed information so that the concealed information becomes visible. It is described that, for example, text written in microscript in the security element is magnified with the aid of an optical lens as verification element when the verification element is brought into register with the security element by folding the security document. It is also possible that the security element and the verification element are configured such that when the verification element covers the security element, they produce a so-called Moiré pattern. By suitably configuring the pattern contained in the verification element or security element, information in the Moiré pattern can be made visible in this fashion. Finally, both the security element and also the verification element can comprise a polarisation element. If the alignment of the plane of polarisation differs suitably from one region to another, information can be made visible in this fashion.

However, with the continually improving copying and forgery techniques at the present time, there is a risk that such flat elements do not offer sufficient security against forgery. Thus, for example, it can be expected that even text applied in microscript can be reproduced using a copier of sufficient resolution. Likewise, the patterns for producing a Moiré pattern can also be reproduced if necessary.

It is thus desirable that the security or verification elements have an even higher degree of security against forgery so that firstly, security documents can be made even more secure against forgery and the verification of authenticity can be more reliable.

This object is achieved using a security system having the features of claim 1, a security element having the features of claim 15, a verification element having the features of claim 16, a security document having the features of one of claims 18 to 20, a readout method having the features of claim 22 or a readout device having the features of claim 24.

A security system according to the invention comprises a flat security element arranged in a carrier plane. The security element comprises a hologram carrier which, under incident light, reconstructs a pattern in a holographic fashion which lies outside the carrier plane. Concealed information is stored in this pattern. The security system according to the invention also comprises an at least partially transparent verification element which on flat contact of the security element under incident light makes it possible to read out the information concealed in the pattern produced holographically by the security element.

On or in an object to be secured, e.g., a security document or banknote there is thus a security element at one location. This security element is a hologram carrier. Under the incident light, the hologram contained therein produces an image or pattern displaced with respect to the document to be secured, which can be two-dimensional or three-dimensional. Concealed information is stored in the pattern. This concealed information, which is now located at some distance from the document can be read out using a verification element.

The concealed information is thus not applied directly to the security document as with known security features but is only generated at some distance from the security document in a holographic fashion. The hologram of the security element makes forgery significantly more difficult. In contrast to holograms already used as a security element so far, the information stored in the holographically generated pattern is however, only made visible by the verification element.

In this way very much better protection against forgery is achieved. In addition, the information is not identifiable without the verification element and thus is not copiable.

In an advantageous development of the security system the security element comprises a hologram which produces a phase-modulated pattern under illumination. The concealed information can in this case be stored such that the phase of the light in the region of the concealed information is different to the phase of the surrounding regions of the pattern. The verification element is then configured such that it converts this phase modulation into a visible amplitude modulation. This can be achieved in a known fashion, for example, by the phase contrast method or the Schlieren method.

In a more advantageous development the verification element also comprises a hologram which, under incident light, reconstructs a corresponding pattern which produces an optical light pattern needed to convert the phase modulation into an amplitude modulation.

Another advantageous development of the security system according to the invention comprises a security element which is a hologram which under incident light again reconstructs a line pattern outside the carrier plane. The verification element is also a hologram which produces a line pattern in the same plane outside the carrier plane. The line patterns are configured such that a Moiré pattern is formed in the same way as if two line patterns actually present at the location of the holographically reconstructed line patterns had been brought into register. By suitably configuring the holograms and the line patterns thereby produced, information can be stored in the Moiré pattern which only becomes visible when they overlap.

In another advantageous development of the security system according to the invention, the security element again produces a pattern in a holographic fashion outside the carrier plane under incident light. This pattern is amplitude-modulated such that it cannot be identified with the naked eye. The verification element comprises a lens structure which makes the amplitude modulation visible to the eye when the verification element is superposed on the security element. For example, the lens structure can be a strip lens structure.

In the development the necessary distance between the object to be imaged by the lens structure, in this case the holographically reconstructed pattern of the security element, and the lens structure is achieved by the holographically produced pattern lying outside the lens plane or the contact area between the verification element and the security element. In this fashion a suitable lens structure can be used for verification without this having a thickness necessary to produce this distance. For security documents such as banknotes the thickness should be kept as small as possible. In this respect, this development according to the invention offers the possibility of utilising the advantages of security against forgery using lens structures even on thin security documents.

In another development of the invention, both the security element and the verification element produce a pattern outside the contact area of the verification element and the security element in a holographic fashion under incident light. Both patterns thus produced each carry a different part of the concealed information. Only when the verification element is brought into register with the security element are the two parts of the concealed information reconstructed with the patterns under incident light and made identifiable in their entirety.

Another development of the invention comprises a security element which again reconstructs in a holographic fashion outside the carrier plane a pattern which is polarisation-modulated. The concealed information is in this case produced such that in the region of the information the polarisation differs from that in the surrounding region. The verification element in this development is a polarisation filter with which the different polarisations can be made visible in a known fashion. In this way the concealed information becomes identifiable. Likewise the security element can also produce a light pattern of constant polarisation and the concealed information can be stored in a polarisation-modulated verification element.

In a further development of the invention the security element is again configured such that it reconstructs an amplitude-modulated pattern outside the carrier plane under incident light. This amplitude modulation carries the concealed information. The verification element comprises a grating structure on a window element. By suitably matching the shape of the grating structure and the holographically produced amplitude modulation, a tilting effect can be achieved as a result of the holographically produced distance between the grating structure and the amplitude modulation. Depending on the direction in which the grating of the verification element is viewed, it is possible to see under the lines of the grating structure, for example and the information present there becomes visible. On the other hand when the verification grating structure is viewed perpendicularly, the information visible between the grating lines of the verification element becomes visible. In this way information can be made visible according to the angle of tilt of the superposed elements.

In order to achieve even greater security against forgery, the security element can be configured such that under incident light, it produces a holographically generated pattern which, however, does not have a constant distance from the carrier plane. The verification element must take this circumstance into account by means of suitably matched local frequencies. With such a configuration no information is visible in the plane of the security document. The pattern in which the concealed information is stored is only produced by holographic reproduction. This pattern is not in a plane but has a varying distance from the plane of the security element. This varying distance can only be compensated with the aid of the verification element. In addition, the information is additionally concealed in that it is stored in the holographically produced, non-plane pattern, e.g. is only stored as phase modulation, polarisation modulation or a line pattern to produce a Moiré pattern. In this case, the verification element thus has different tasks. Firstly, it equalises the different distance of the holographically produced pattern from the carrier plane. Secondly, it makes visible the information concealed in the holographically produced pattern.

The holographically produced pattern which is formed on the security element as a result of the incidence of light can have different distances from the carrier plane. Especially advantageous however is the order of magnitude of several 100 μm, more advantageously 100 to 300 μm. In this way a 3D hologram can be produced. Despite the difficulties involved in applying or inserting a hologram onto the rough surface of a banknote, for example, the lack of definition can be kept within tolerable limits for a 3D hologram that produces a pattern at such a short distance from the carrier plane.

The information stored in the holographically generated pattern, which appears as a result of light being incident on the security element can be read out using an external verification element. However, it is especially advantageous if both the verification element and the security element are applied to one and the same security document. By suitably folding the security document, the elements can then be brought into register in order to make the concealed information visible. In this way, it is possible to have a self-verifying system. With a suitable arrangement of elements on the banknotes, the same effect can also be achieved by superposing two banknotes in corresponding alignment.

The pattern reconstructed as a result of the incidence of light on the security element can be virtual or real according to the configuration, i.e. it can be imaged on a screen.

A security element according to the invention for use in a security system according to the invention comprises a hologram structure which reconstructs a pattern with concealed information outside the carrier plane in a holographic fashion under incident light. A verification element for use with a security system according to the invention serves to make visible the concealed information which is reconstructed by a security element according to the invention outside the carrier plane of the security element when light is incident.

The verification element is at least partly transparent. In addition to the structures which serve to make the concealed information visible, the verification element can also have a further security feature. For example, a further hologram structure can be applied which produces another image which is superposed on the concealed information as a background.

A security document according to the invention comprises a security element according to the invention and/or a verification element according to the invention.

In a method according to the invention for reading out information concealed in the pattern reconstructed holographically on the security element under incident light, a verification element according to the invention is brought into register with the security element. If the security element and the verification element are provided on a banknote, for example, it is advantageous if the verification element is brought into register with the security element by folding the document. In this way, verification is possible without the need for further aids.

The security system according to the invention can be configured such that when the verification element and the security element suitably overlap, the concealed information is made visible to the naked eye under suitably incident light. However, an apparatus according to the invention can also be provided which makes verification possible mechanically. Such an apparatus comprises a device which brings the security element into register with a verification element. In this case, the verification element can be part of the apparatus or it can be applied to the object to be verified itself and can be brought into register with the security element by mechanical folding. An illumination device is provided which illuminates the security element and verification elements brought into register. The concealed information thus becomes visible and can be read out with the aid of a readout device. This can, for example, be a brightness detector which can detect brightness differences in the concealed information. Finally, the readout device can be a camera which makes it possible to process the image and evaluate the image of the concealed information.

Figure 2:
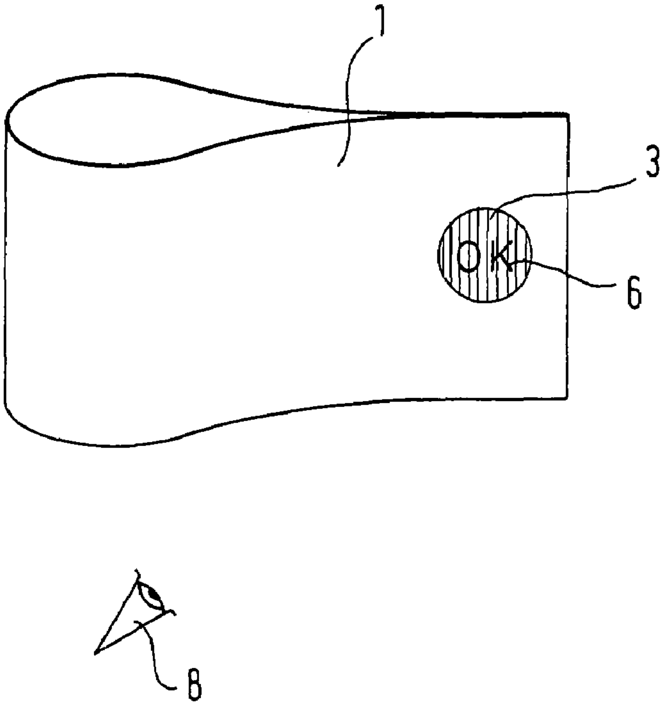
Figure 3:
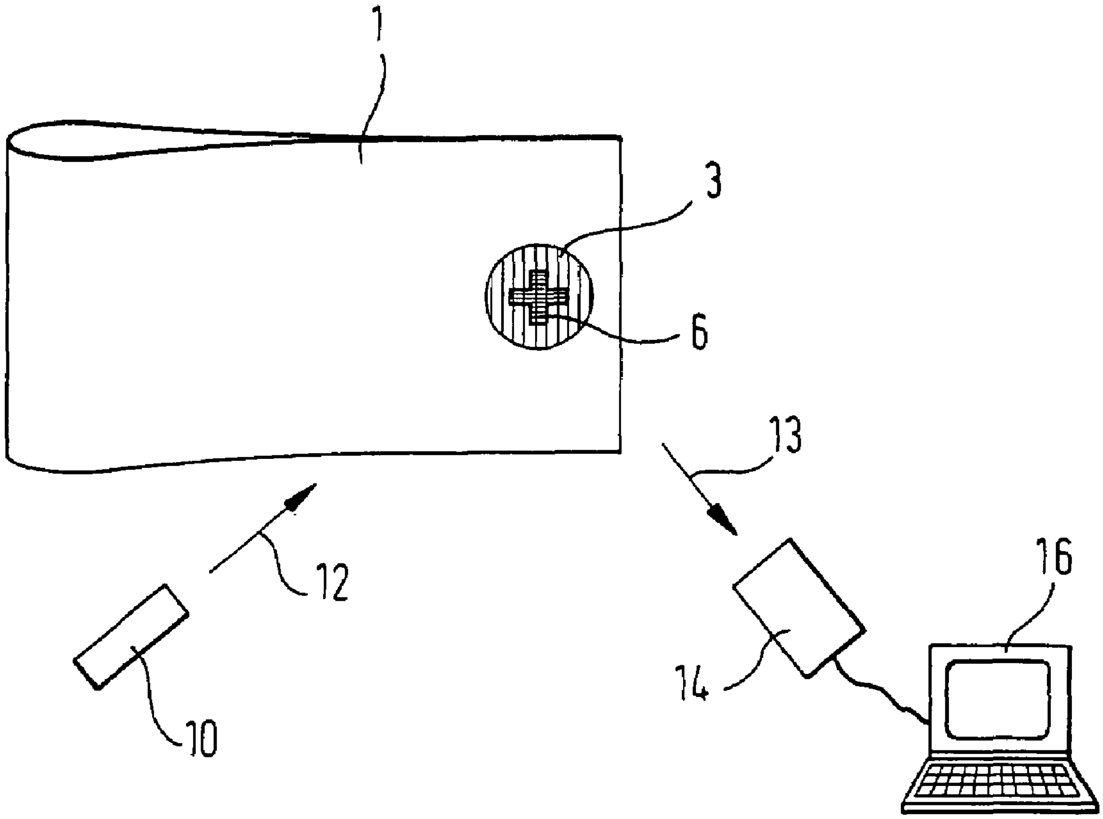
Figure 4:
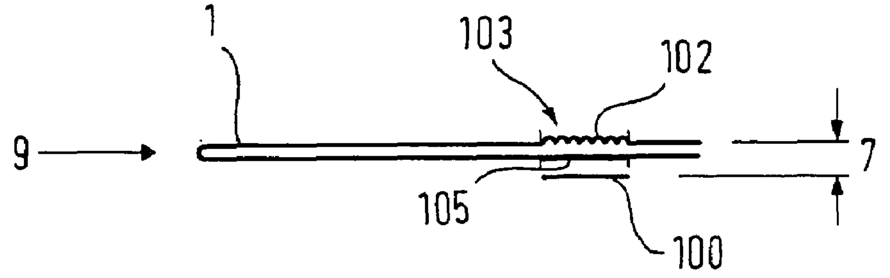
Figure 5:
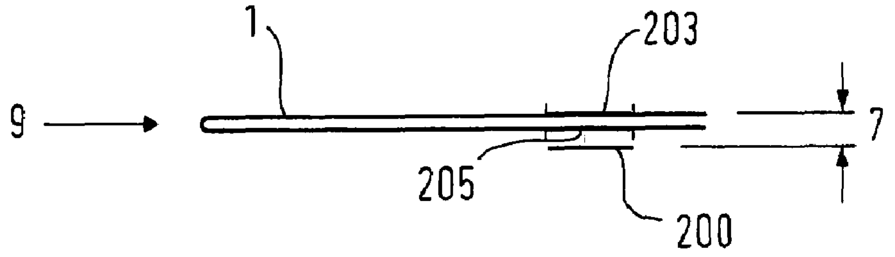
Figure 6:
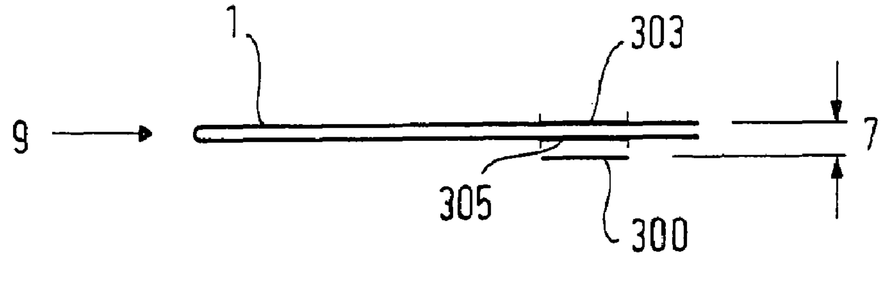
Figure 7:
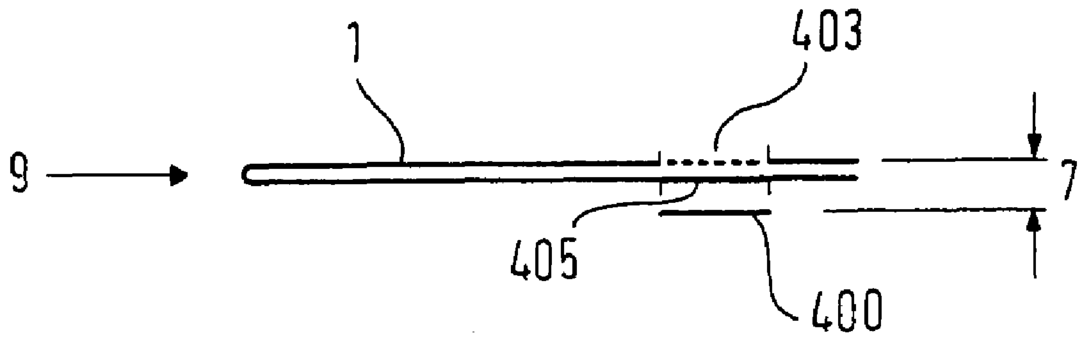
Figure 8:
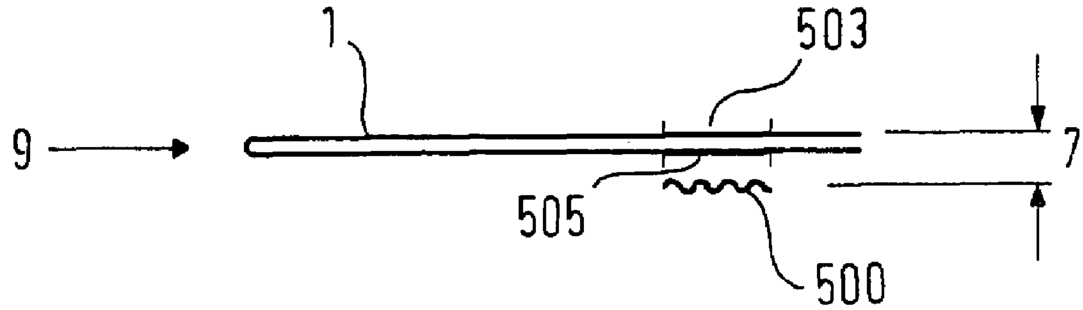

Embodiments of the invention according to the invention are explained with reference to the appended drawings wherein FIG. 1 is a schematic view of a security document according to the invention with a security element according to the invention, FIG. 2 is a schematic view of a readout device according to a method according to the invention, FIG. 3 is a schematic view of a mechanical readout process according to the invention, FIG. 4 is a schematic side sectional view of an embodiment of a security document according to the invention during the readout process, FIG. 5 is a schematic side sectional view of a further embodiment of the security document according to the invention during the readout process, FIG. 6 is a schematic side sectional view of a further embodiment of the security document according to the invention during the readout process, FIG. 7 is a schematic side sectional view of a further embodiment of the security document according to the invention during the readout process, FIG. 8 is a schematic side sectional view of a further embodiment of the security document according to the invention during the readout process.

FIG. 1 shows a security document 1, e.g. a banknote with a verification element 3 and a security element 5. In the example shown the verification element is shown hatched. The security element 5 comprises a hologram carrier. According to one embodiment, under incident light this hologram carrier produces a pattern outside the plane of the document 1, e.g. the banknote. The pattern thus produced holographically is advantageously at a distance 7 of 100 to 300 μm from the surface of the banknote 1. The reference numbers 1, 3, 5, 7, and 9 are used generally in the following for various embodiments.

In an embodiment in which the verification element 3 carries a line grating, under incident light the security element 5 produces a holographic pattern that is also modulated in a stripe fashion. If a verification element 3 is brought into register with the security element 5, the line grating of the verification element is at a distance from the holographically produced pattern. In this fashion, by tilting, for example, the region below the line grating can be made visible or by viewing in the perpendicular direction, the region between the light grating of the verification element 3. In this fashion tilting effects can be produced which are otherwise only visible in the presence of an actual spacing between the grating pattern and the image plane.

In FIG. 7 such an embodiment is shown schematically in a side sectional view. Shown is a folded banknote 1 where the verification element 403 and security element 5, 405 have been brought into register. This is the position during the readout process. In this description the term "readout" is used generally for the verifying, whether this is with the naked eye or mechanically.

When light is suitably incident, a holographically produced pattern 400 reconstructs from the hologram of the security element 5, 405 at the distance 7 from the plane of contact 9. The verification element is transparent and provided, for example, with a printed-on stripe pattern. As a result of the distance 7, the region of the holographically produced pattern 400 which is visible through the stripe pattern of the verification element 3, 403 depends on the direction of viewing onto the security element 5, 405. Depending on the viewing direction, for example, the region below the stripe pattern 3, 403 can be visible or the region between the stripes of the verification element 3, 403.

As also in FIGS. 4, 5, 6 and 8, the region in which the verification element and the security element are located is indicated by short perpendicular lines on the banknote 1. Naturally these are not objective features. In addition, FIGS. 4 to 8 should not be seen as true to scale. Especially, for example, the distance 7 is very much smaller. The verification element and the security element lie directly one on top of the other and are preferably each no thicker than the banknote 1.

The security element 5 which is visible in FIG. 1 can also be a hologram carrier which produces a phase-modulated pattern outside the plane of the banknote 1 under incident light. In this case, the verification element 3 is an element that converts this phase modulation into amplitude modulation. For example, if this phase modulation is in the form of the letters OK, by superposing the verification element 3 with the security element 5, as shown in FIG. 2, the concealed information "OK" 6 becomes visible to the eye 8.

In another embodiment shown in side view in FIG. 5, the security element 5, 205 produces a line pattern 200 outside the plane of the banknote 1 under incident light. The verification element 3, 203 also produces a line pattern under incident light in the same plane outside the banknote 1 if the verification element 3, 203 and the security element 5, 205 are superposed. The line patterns are adjusted such that a Moiré pattern is obtained, as is known for the superposition of actual line patterns. Information can be stored in this Moiré pattern by means of a suitable arrangement of the holographically produced lines so that the letters "OK", for example again become identifiable.

Finally, the security element 5, 105 can also produce a pattern 100 outside the plane of the banknote 1 which is made visible with the aid of a lens structure 102 in the verification element 3, 103, e.g. by magnification, see FIG. 4. For this purpose the lens structure must have a certain distance 7 from the pattern to be imaged which is obtained according to the invention by the holographic reconstruction of the pattern 100. The lens structure 102 does not need to have a certain thickness, as is usually the case, to produce this distance from the object to be imaged. For example, a lenticular lens structure is possible.

Another simple embodiment comprises a security element 5 which under incident light reconstructs a holographically produced pattern outside the plane of the banknote 1, which only carries some of the information which by itself is not expressive. The verification element 3 comprises a comparable holographic structure which reconstructs a holographically produced pattern in the same plane outside the banknote 1, which represents the remainder of the information. If the verification element is now brought into register with the security element and exposed to light, both parts of the concealed information become visible and can be read out together.

For example, the part information produced in a holographic fashion by illuminating the security element 5 can comprise parts of the letters O and K which by themselves alone are not recognisable as such. The remaining parts of the letters O and K are produced by illuminating the verification element holographically at the same location when the two elements come to lie one on top of the other. In this fashion the complete image OK becomes recognisable.

In another embodiment of the side view in FIG. 6, there is, for example, a security element 5, 305 which holographically produces a pattern 300 outside the plane 9 of the banknote 1 which has different polarisation in different regions. Whereas, for example, most of the holographically reconstructed pattern 300 has a vertical polarisation, the polarisation in the region of the letters O and K is horizontal. The verification element 3, 303 is a polarisation filter which is vertically polarised. In this fashion the horizontally polarised light from the regions of the holographically produced pattern, corresponding to the letters O and K, cannot pass through the verification element 3, 303 so that these appear black.

The holographically produced distance 7 between the reconstructed pattern of the security element makes forgery difficult. The usual direct storage of information on the banknote is easier to forge than a hologram which exhibits corresponding information in a displaced plane. In addition, the information is such that it can only be read out with the aid of the verification element. Without such a verification element the holographically stored information is unrecognisable. Even higher security from forgery can be achieved if the holographically produced pattern 505 does not have a constant distance 7 from the banknote 1 but, for example, reconstructs in a wavy surface or in a stepped surface, as shown schematically in FIG. 8. Again the waviness is very much smaller than shown. In such an embodiment the verification element 3, 503 is configured such that it takes account of this non-constant distance wherein this can be achieved by a suitable local frequency of the verification element.

The hologram structures required for the above embodiments can be produced optically in the conventional fashion or they can be computer-generated. They can naturally be provided at different locations or even in plurality on the banknote. Likewise, an arrangement in two opposite corners of the banknote is feasible for example. The security element can produce both a virtual and a real image which can be captured on a screen.

The verification element 3 is at least partly transparent. Thus, light can pass through the verification element onto the security element and make the holographic pattern stored therein visible behind the banknote 1. Examining this pattern through the verification element makes the concealed information visible.

In addition, another security feature can be provided on the verification element itself, e.g. a further hologram structure which causes another optical effect in order to further increase the security against forgery. Naturally, the transparency of the verification element must remain sufficient so that the concealed information can still be read out. FIG. 2 shows the readout process. Viewer 8 sees the folded banknote 1. The verification element 3 lying on the security element 5 makes visible the information concealed in the pattern generated holographically by the security element 5.

FIG. 3 is a schematic view of a mechanical arrangement for reading out the security system. In a fashion not shown the banknote 1 is folded mechanically so that the verification element 3 and the security element 5 come to lie one on top of the other. In a transport device again not shown, the banknote thus folded is brought into the beam path of an illumination device 10 with a light direction 12. The light beam 12 passes through the verification element 3 onto the security element 5 that is not visible in FIG. 3. There the pattern is produced holographically outside the banknote 1 by the security element 5. The holographically produced pattern is recorded by the verification element 3, that is at least partly transparent, with the aid of the camera 14, e.g. a CCD camera, in the direction 13. The verification element 3 thereby makes recognisable the concealed information visible in the holographically produced pattern. The image thus produced with the visible concealed information is fed from the camera 14 to a computer unit 16, for example. Here the image can be evaluated using known image processing methods, e.g. a comparison with expected images in order to verify authenticity.

With a suitable configuration of the security element 5, the light source 10 can also be arranged behind the folded banknote 1.

In another embodiment of an apparatus for readout according to the invention which is not shown here the verification element is not fixed to the banknote but in the machine itself and the banknote 1 is moved past with the security element 5 thereon.

The security system according to the invention thus offers the advantage that the concealed information is stored in a pattern that does not lie in the plane of the banknote or the security document 1. Instead of this, the pattern is produced holographically outside the security document 1. This makes forgery significantly more difficult. In addition, such holographic displacement of the pattern with the concealed information makes verification possible using elements which normally must have a certain distance from the pattern with the concealed information, e.g., lenticular lens structures or line gratings with a tilting effect. No increased thickness is needed for this purpose in the invention since the distance is produced holographically.

The invention claimed is:

1. Security system for a security document, said security system comprising;

a flat security element in a carrier plane that under incident light holographically reconstructs outside the carrier plane a pattern in which concealed information is stored, and with a flat at least partly transparent verification element which on flat contact with the security element makes the information stored therein readable, wherein the security element comprises a first hologram carrier which under incident light reconstructs outside the carrier plane an amplitude-modulated pattern which carries a recognizable first part of the previously concealed information, and the verification element comprises a second hologram carrier which under incident light reconstructs outside the carrier plane an amplitude-modulated pattern carrying the recognizable remainder of the previously concealed information such that when light is incident simultaneously on both hologram carriers in the superposed state, both patterns are reconstructed and combine to give recognizable information.

2. Security system according to claim 1, wherein the security element and the verification element are arranged on the same security document.

3. Security system according to claim 1, wherein the distance of the pattern reconstructed by the incidence of light on the security element from the carrier plane is at least 100 μm.

4. Security system according to claim 1, wherein the verification element and the security element are applied or inserted onto or in an object such that they are brought into flat contact by folding the object.

5. Security system according to claim 1, wherein the verification element is fitted with an additional security feature.

6. Security system according to claim 1, wherein the distance is in the range of 100 to 300 microns.

* * * * *